US009185025B2

(12) United States Patent
Kini et al.

(10) Patent No.: US 9,185,025 B2
(45) Date of Patent: Nov. 10, 2015

(54) INTERNETWORKING AND FAILURE RECOVERY IN UNIFIED MPLS AND IP NETWORKS

(75) Inventors: Sriganesh Kini, Fremont, CA (US); Hector Avalos, Massy Cedex (FR)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 568 days.

(21) Appl. No.: 13/531,236

(22) Filed: Jun. 22, 2012

(65) Prior Publication Data
US 2013/0343180 A1 Dec. 26, 2013

(51) Int. Cl.
*H04L 12/26* (2006.01)
*H04L 12/703* (2013.01)
*H04L 12/707* (2013.01)
*H04L 12/723* (2013.01)

(52) U.S. Cl.
CPC .............. *H04L 45/28* (2013.01); *H04L 45/22* (2013.01); *H04L 45/50* (2013.01)

(58) Field of Classification Search
USPC ................... 370/228; 340/2.9; 714/4.1–4.5
See application file for complete search history.

(56) References Cited

U.S. PATENT DOCUMENTS

| 6,618,817 | B1 * | 9/2003 | Armstrong ...................... 714/4.4 |
| 7,626,925 | B1 * | 12/2009 | Sivabalan et al. ............. 370/228 |
| 7,953,103 | B2 * | 5/2011 | Raza .............................. 370/432 |
| 8,081,633 | B2 | 12/2011 | Veits |
| 8,446,920 | B2 * | 5/2013 | Hillier et al. .................. 370/469 |
| 8,619,598 | B2 * | 12/2013 | Martini et al. ................ 370/249 |
| 8,638,695 | B2 * | 1/2014 | Zheng et al. .................. 370/256 |
| 2007/0091793 | A1 * | 4/2007 | Filsfils et al. ................. 370/228 |
| 2008/0228932 | A1 | 9/2008 | Monette et al. |
| 2009/0092140 | A1 | 4/2009 | Gibbons et al. |
| 2009/0147674 | A1 | 6/2009 | Scudder et al. |
| 2009/0201800 | A1 | 8/2009 | Naseh et al. |
| 2010/0262679 | A1 * | 10/2010 | Liu ................................ 709/220 |
| 2011/0274111 | A1 | 11/2011 | Narasappa et al. |
| 2013/0016605 | A1 * | 1/2013 | Chen ............................. 370/221 |
| 2013/0308444 | A1 * | 11/2013 | Sem-Jacobsen et al. ...... 370/230 |
| 2013/0332597 | A1 * | 12/2013 | Kumar ........................... 709/224 |
| 2013/0336108 | A1 * | 12/2013 | Vasseur et al. ................. 370/225 |

OTHER PUBLICATIONS

The International Search Report for the PCT Application No. PCT/IB2013/055127 dated Nov. 27, 2013, the whole document.
Rosen E., et al. "Multiprotocol Label Switching Architecture" IETF RFC 3031, Jan. 2001, the whole document.
Bocci E., et al. "A Framework for MPLS in Transport Networks" IETF RFC 5921, Jul. 2010, the whole document.
Allan D., "Requirements and Framework for Unified MPLS Sub-Network Interconnection" IETF, Oct. 2011, the whole document.
Swallow, et al. "MPLS Fault Management Operations, Administration, and Maintenance (OAM)" IETF RFC 6427, Nov. 2011, the whole document.
Frost E., et al. RFC 6375 "A Packet Loss and Delay Measurement Profile for MPLS-Based Transport Networks", Sep. 2011, the whole document.

\* cited by examiner

*Primary Examiner* — Mark Rinehart
*Assistant Examiner* — Peter Solinsky (57) ABSTRACT

A primary border node (BN) and a standby BN are provided for internetworking two network domains, such that connectivity between the two network domains is maintained when a failure occurs in one of the network domains. The two network domains include an access network that implements MPLS-TP and a core network that implements IP, MPLS, or a combination of both. The primary BN establishes a tunnel from itself to the standby BN, and re-directs network data traffic from itself to the standby BN via the tunnel when it detects that an access node has switched connection from the primary VN to the standby BN. The primary BN also monitors its connections to the core network, and signals access nodes to switch to the standby BN if a failure is detected in these connections.

18 Claims, 4 Drawing Sheets

INTERNETWORKING AND FAILURE RECOVERY IN UNIFIED MPLS AND IP NETWORKS

TECHNICAL FIELD

Embodiments of the invention relate to the field of network operations; and more specifically, to internetworking the communications between two network domains that support different network protocols.

BACKGROUND

Multi-Protocol Label Switching (MPLS), as defined in RFCs 3031 and 3032, describes an architectural framework that supports a variety of network services. MPLS Transport Profile (MPLS-TP) is a profile of MPLS that is targeted at the transport domain of an MPLS network. MPLS-TP also defines an architectural framework for delivering network services.

An access network is a part of a telecommunications network that connects subscribers to their immediate service providers. An access network can be contrasted with a core network, which connects service providers to each other. An access network is generally a transport domain and is suitable for deploying MPLS-TP. However, a core network generally deploys MPLS, Internet Protocol (IP), or a combination of MPLS and IP. Due to the different protocols used in these two network domains, an interworking layer is typically implemented at the boundary between the two domains to facilitate the inter-domain communications. This interworking layer can be designed as a third architecture or layer, such as a Virtual Local Area Network (VLAN), as is typical the case in handoffs between two network domains. However, this third architecture or layer can introduce a new set of problems, such as a need for re-designing resiliency and operations, administration and maintenance (OAM), which can cause a significant increase both in capital expenditure and operating expenses of a telecommunications network.

SUMMARY

A primary border node (BN) and a standby BN are provided for internetworking two network domains, such that connectivity between the two network domains is maintained when a failure occurs to a node or a link in one of the network domains. The two network domains include an access network that implements MPLS-TP and a core network that implements IP, MPLS, or a combination of both. The access network includes a plurality of access nodes and is coupled to the core network via the primary BN and the standby BN.

In one embodiment, a method performed by the primary BN comprises establishing a tunnel from the primary BN to the standby BN; forwarding network data traffic that is originating in the core network from the primary BN to a given access node via an active path; detecting that the given access node has switched network connection from the active path to a standby path, which connects the standby BN to the given access node; and re-directing the network data traffic that is originating in the core network and received by the primary BN from the primary BN to the standby BN via the tunnel.

In one embodiment, a network node functioning as the primary BN includes receiver circuitry configured to receive network data traffic from the core network and the access network; transmitter circuitry configured to send the received network data traffic to the core network and the access network; and a processor configured to forward the network data traffic that is originating in the core network from the primary BN to a given access node via an active path, and to detect that the given access node has switched network connection from the active path to a standby path, which connects the standby BN to the given access node. The network node also includes an internetworking module coupled to the processor. The internetworking module configured to establish a tunnel between the primary BN and the standby BN prior to detection of switched network connection, and to re-direct the network data traffic originating in the core network and received by the primary BN from the primary BN to the standby BN via the tunnel.

In one embodiment, the primary BN also monitors its connections to the core network, and signals access nodes to switch to the standby BN if a failure is detected in these connections.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

A failure recovery mechanism for a unified MPLS architectural framework is described. The failure recovery mechanism operates in a network environment in which an access network is coupled to a core network via a pair of redundant border nodes (BNs). One BN serves as the primary BN, and the other BN serves as the standby BN. Each BN is implemented by a network node such as a router for interworking between an MPLS domain (e.g., the core network) and an MPLS-TP domain (e.g., the access network). The interworking function performed by the BN includes terminating, swapping and encapsulating labels. The BNs can be used for IP service termination, which does not require any non-MPLS handoff between the MPLS-TP domain and the MPLS domain. In the embodiments described herein, the core network is not restricted to be an MPLS network; in some embodiments, the core network can be an all-IP network or a combination of MPLS and IP network. Thus, the core network is hereinafter referred to as an MPLS/IP network.

In the network environment described herein, a service node (SN) within or coupled to a core network may need IP connectivity to a large number (e.g., tens or hundreds of thousands) of customer edges (CEs) that are coupled to an access network. Connectivity between the SN and the CEs is provided by the redundant pair of BNs. The path from SN to the primary BN is an MPLS Label Switched Path (LSP) and the path from the primary BN to the CEs is an MPLS-TP LSP. If either of these LSPs fails or if the primary BN fails, the connectivity between the SN and the CEs can be maintained by switching the affected communication paths over from the primary BN to the standby BN. As described herein, an SN is a networked processing device (e.g., a server computer) that provides services to users. The service provided by an SN can be any generic service such as Voice-over-IP (VoIP), Web services, etc. A CE is a network node at the customer premises that is connected to an access node of a service provider's network (e.g., an access network). A CE can be a router, cell-site equipment such as a base station, or other network elements.

In a typical deployment, each service is placed within its own container/sandbox using MPLS based Layer 3 Virtual Private Network (L3VPN). This L3VPN is referred hereinafter as a VPN. Each VPN is a virtualized service network for providing a particular service; e.g., a VoIP service network that provides VoIP service. Different VPNs can be used for delivering services of different types or different technologies; e.g., 2G, 3G, 4G, VoIP, etc. A VPN may include one or more SNs delivering a service to a number of CEs via a BN and a number of access nodes. The MPLS-TP LSP between each of these access nodes and the BN form a pseudowire for the service network. In the following description, the term "psuedowire" is used synonymously with an MPLS-TP LSP between an access node and the BN.

Figure 1A:
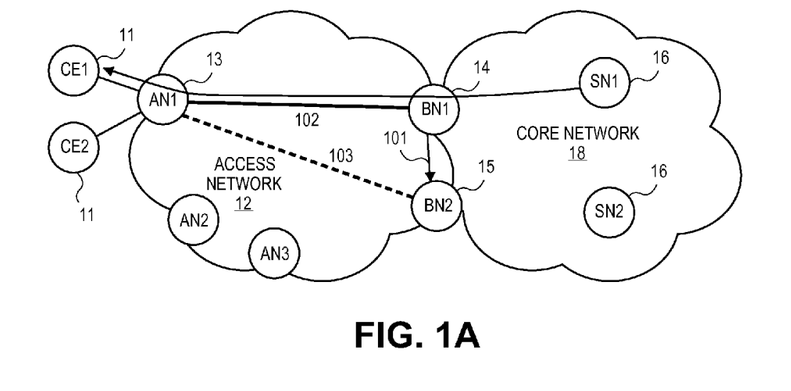
FIGS. 1A and 1B illustrate an embodiment of a network environment in which an access network is coupled to a core network.
Figure 1B:
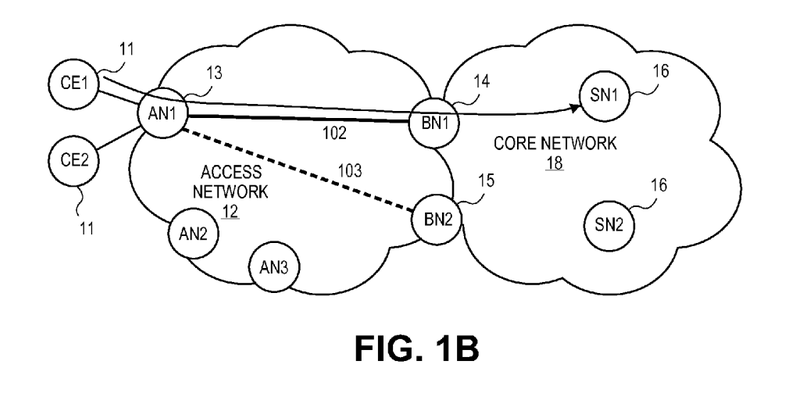

In current architectures and standards, the failure recovery mechanisms in the MPLS-TP and MPLS/IP domains work independently and in isolation. Due to the independent nature of each domain, a failure in one domain may be left unresolved even though it could have been recovered by an action in another domain. The term "failure" hereinafter includes the scenarios of lost connections and persistent network problems that occur to one or more nodes or links in the networks 12 and 18. FIGS. 1A and 1B illustrate the scenarios where independent network domains may cause problems in failure recovery, as well as mechanisms for proper handling of the internetworking with respect to failure recovery.

FIG. 1A illustrates an embodiment of an access network 12 coupled to a core network 18 via a pair of BNs (BN1 14 and BN2 15). The access network 12 is a MPLS-TP network and the core network 18 is an MPLS/IP network. The access network 12 includes multiple access nodes 13 (e.g., AN1, AN2 and AN3), each of which is connected to multiple CEs 11 (e.g., AN1 is connected to CE1 and CE2). In one embodiment, BN1 serves as a primary BN and BN2 serves as a standby BN for AN1. Through BN1 and AN1, CE1 and CE2 are able to receive services from service nodes 16 (e.g., SN1) in the core network 16.

In one embodiment, AN1 maintains an active path 102 to BN1 and a standby path 103 to BN2. Each of the active path 102 and the standby path 103 is an MPLS-TP pseudowire for delivering a service in a service network. When a failure occurs on the active path 102, AN1 switches over from the primary BN1 to the backup BN2 to avoid the failure, utilizing the standby path 103 to communicate with the core network 18. However, SN1 is not immediately informed of the switchover performed by AN1. It may take a long time (e.g., hundreds of milliseconds) before the routing from SN1 to BN2 converges; in the meanwhile SN1 continues to send data traffic to BN1 as before AN1's switchover. Since BN1 does not have reachability to CE1, the data traffic is lost. This traffic loss may continue until the routing in the core converges and the traffic from the SN goes to BN2.

To resolve the loss of data traffic caused by a switchover in the access network 12, in one embodiment, BN1 establishes a tunnel 101 to BN2 before any switchover occurs. The tunnel 101 can be established using known tunneling techniques such as MPLS without Penultimate-Hop Popping (PHP), Generic Routing Encapsulation (GRE), IP-in-IP, etc. When BN1 receives a packet from the core network 18 that is to be sent on the previously active path 102, BN1 re-routes the packet to BN2 as a next hop through the tunnel 101. Since AN1 has switched over to BN2, BN2 has a directly connected route for sending that packet to AN1 and therefore the packet is able to reach CE1. In one embodiment, BN1 sends the packet over the tunnel 101 only for a predetermined short time (e.g., 200 milliseconds) after the active path 102 goes down to prevent traffic looping. This predetermined short time is an estimated amount of time for the routing in the core network 18 to converge.

FIG. 1B illustrates an embodiment of the same two network domains 12 and 18 as in FIG. 1A, except that in this scenario BN1 loses connectivity to the core network 18 while the active path 102 to BN1 remains active. Data traffic from CE1 to SN1 is lost even though there exists a well-functioning path from the CE1 to the SN1 via BN2. This scenario illustrates the problem when the redundancy of psuedowires (e.g., the active path 102 and the standby path 103) is independent of the BN's loss of connectivity to the core network 18.

Further, in a scenario where BN1 still has connectivity to the core network 18 but BN1's connectivity to SN1 is affected by a network problem, data traffic between CE1 and SN1 can also be affected. The network problem in the core network 18 may be caused by a problem in routing or forwarding along the path from BN1 to SN1, such as persistent traffic congestion along the path from BN1 to SN1.

To allow the CEs to continue to reach SN1, in one embodiment, BN1 proactively monitors its connectivity to SN1 before a failure occurs to the connection between BN1 and SN1. BN1 may monitor one or more of the following conditions and each condition is described below.

A first condition (C1) that BN1 may monitor is its immediate next hops (also referred to as "next hops") that connect BN1 to the core network 18. C1 is true when at least one of these next hops is up (i.e., active). C1 is false when all of these next hops are down. That is, the condition C1 is a logical OR of the 'up' condition of each next hop of the BN in the core network 18. In one embodiment, BN1 monitors a next hop by monitoring an interface to a neighboring router in the core network 18. Thus, the term "next hop" herein refers to an interface of BN1 that connects BN1 to a neighboring node of BN1. The monitoring of each of the next hops can be performed with a Bidirectional Forwarding Direction (BFD) session. Additional monitoring can be performed using loss or delay measurements. In one embodiment a threshold is used to determine to when to declare this condition is false. Since the number of next hops is a relatively small number, BN1 can use an aggressive timer, e.g., a timer of a few milliseconds (e.g., 3 milliseconds), to monitor its next hops in the core network.

A second condition (C2) that BN1 may monitor is the LSP tunnels that the VPN route of a SN is pointing to. This condition can be denoted as C2(SN) to indicate the condition as associated with a particular SN. C2(SN) is true when at least one of these LSP tunnels is up. C2(SN) is false when all of these LSP tunnels are down.

Figure 2:
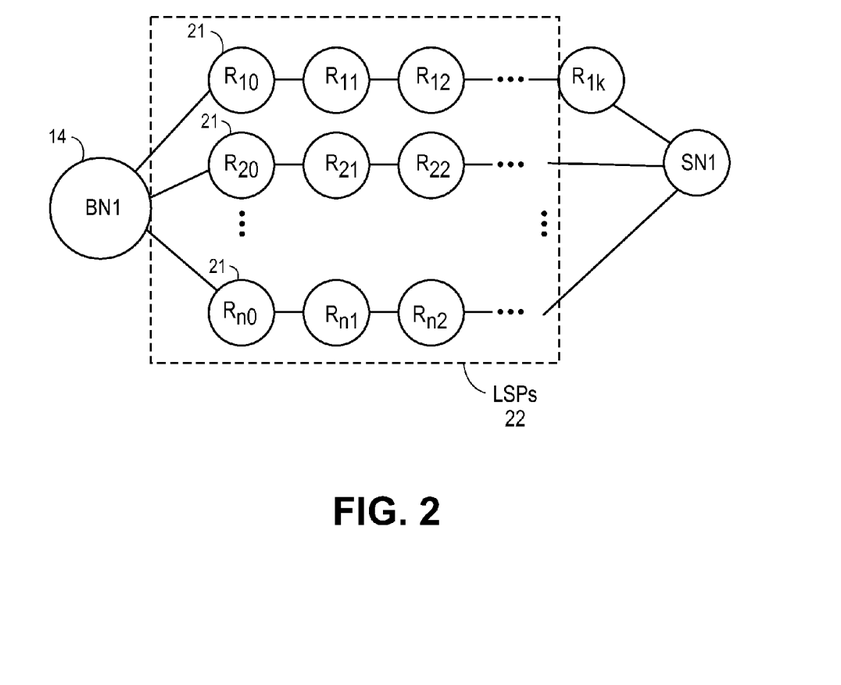
FIG. 2 illustrates a set of paths connecting a border node to a service node according to one embodiment.

An example of the LSP tunnels is illustrated in FIG. 2. FIG. 2 shows n sets of LSPs 22 between BN1 and SN1. Each of the n sets is an LSP, also referred to as an LSP tunnel. An LSP tunnel between BN1 and SN1 is a path that connects BN1 to a neighboring node of SN1. That is, an LSP tunnel includes the link between BN1 and its neighboring node 21 (e.g., $R_{10}$), the link between the neighboring node 21 to the next neighboring node (e.g., $R_{11}$), and so on, and the link connecting to the last node (e.g., $R_{1k}$) before reaching SN1. Each of the nodes along the LSP tunnel is capable of performing label switching according to the MPLS. In one embodiment, each of these nodes along the LSP tunnel is a label switch router (LSR). FIG. 2 shows that the LSPs 22 do not include the link between the last hop (e.g., $R_{1k}$) and SN1. This is because an SN typically communicates with CEs and other SNs using IP and is typically not MPLS capable. In alternative embodiments where SNs are MPLS capable, the LSPs 22 can include the link between the last hop (e.g., $R_{1k}$) and SN1.

In one embodiment, the monitoring of C2(SN) can be performed with MPLS BFD. LSP pinging may also be used if BFD is not present. However, LSP pinging may be slower than BFD in detecting connection failures or problems. Because the number of LSP tunnels scales with the number of SNs in the core network, the number of LSP tunnels that needs to be monitored in C2 is typically more than the number of next hops monitored in C1. Therefore, BN1 may use a less aggressive timer, e.g., a timer of a few tens of milliseconds, to monitor several tens or a few hundreds of LSP tunnels.

A third condition (C3) that BN1 may monitor is an SN's status. This condition can be denoted as C3(SN) to indicate the condition as associated with a particular SN. Condition C3(SN) can be used for monitoring the link form an SN to the core network 18 (e.g., the link between $R_{1k}$ and SN1), as well as for detecting a scenario of a silent failure where a link along the path from BN1 to the SN has failed silently and the routing mechanism in the network has not detected the failure. In one embodiment, BN1 may monitor C3(SN) by send IP ping signals to the SN. If a silent failure exists on the path between BN1 and the SN, the ping signals may be able to detect it and a switchover to BN2 can restore the connectivity from the CEs to the SN. In one embodiment, the existence of a failure is detected when no response is received or a failure indication is received in response to the ping signal. This monitoring is performed with the least aggressive timer, since the SN may not be capable of processing a large number of packets used for monitoring purposes. Also, the CPU cycles used by the SN to process these monitoring packets may take away CPU cycles from processing service-specific packets.

The monitoring mechanisms described above can be performed by the data plane of the BN. Control plane based monitoring may also be used but is much slower. Thus, control plane based monitoring is typically not used when data plane based monitoring is available. An example of control plane based monitoring is to monitor the prefixes in Interior Gateway Protocol (IGP)/Border Gateway Protocol (BGP).

The monitoring mechanisms described above can be summarized in the following formulation:

```
if (C1 == false) then
    send Alarm Indication Signal (AIS) with Link Down Indication
    (LDI) set along all MPLS-TP LSPs in the access network
endif
if (C2(SN) == false OR C3(SN) == false) then
    send AIS with LDI set along the corresponding MPLS-TP
    psuedowires in the access network
endif
```

Note that the above formulation assumes that there is a single SN in the service network (e.g., VPN) being monitored. If there are more than one SN in the service network, then the condition checks for C2 and C3 are to be performed for each of the SNs in the service network and the resulting condition should be an AND of all of such condition checks. For example, if a VPN includes SN1 and SN2, Cb 2(SN) is false if both C2(SN1) and C2(SN2) are false. The same applies to condition C3.

When the condition C1 is false, the AIS sent by BN1 causes all of the access nodes in the access network to perform a switchover to the redundant BN2. When either C2 or C3 is false, the AIS sent by BN1 causes all of the access nodes to perform a switchover to the redundant BN2 for those psuedowires in the service network corresponding to the SN. To prevent the switchover from BN1 to BN2 from occurring continuously for conditions such as both BNs losing connectivity to the SN, this switchover is dampened; e.g., by spacing consecutive switchover events by a minimal time period.

Embodiments of the invention provide mechanisms to convey and act on failure information between MPLS/IP and MPLS-TP domains such that traffic is recovered under failure conditions. The mechanisms provided herein include procedures for interworking the management and resiliency of the two domains such that communications between the two domains can be maintained when a failure occurs in either domain. These mechanisms can reduce the traffic loss to less than 50 milliseconds for most failure conditions.

Figure 3A:
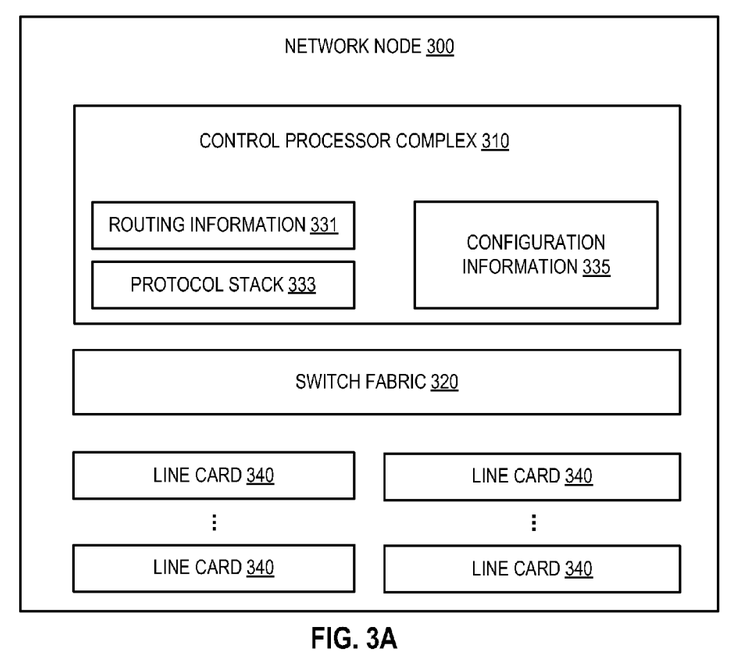
FIG. 3A is a block diagram illustrating a network node according to one embodiment.
Figure 3B:
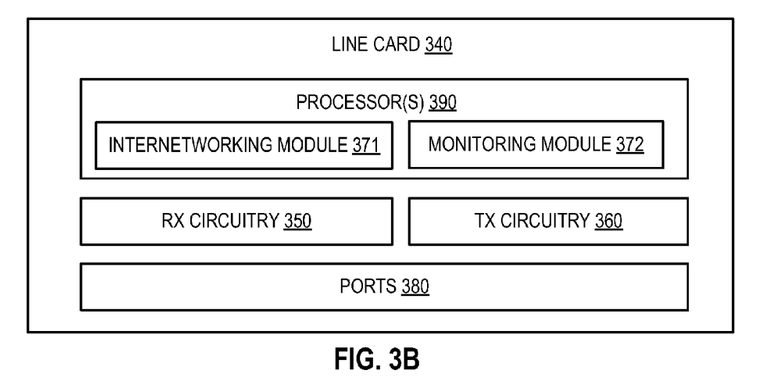
FIG. 3B illustrates an embodiment of a line card in the network node of FIG. 3A.

FIG. 3A illustrates an example of a network node 300 that may function as a primary BN or a standby BN. In one embodiment, the network node 300 is a router that is capable of handling MPLS, MPLS-TP and IP protocols. FIG. 3B illustrates an example of a line card 340 within the network node 300.

As shown in FIGS. 3A and 3B, the network node 300 includes a data plane, which further includes a switching fabric 330 and a number of line cards 340. Each line card 340 include one or more processors 390, receiver (Rx) circuitry 350, transmitter (Tx) circuitry 360 and multiple ports 380. The Rx and Tx circuitry 350 and 360 interface with links in the network through the ports 380. The line cards 340 perform functions on data received over the circuitry 350 and 360, and the switching fabric 330 switches data between the line cards. In one embodiment, the processors 390 in each line card 340 may further include an internetworking module 371 and a monitoring module 372. The internetworking module 371 is configured to establish a tunnel between the network node 300 and another network node (e.g., a standby BN), and to re-direct data traffic to the other network node via the tunnel. The monitoring module 372 is configured to monitor the conditions C1, C2 and C3 as described above.

The network node 300 also includes a control plane, which is shown as a control processor complex 310. In one embodiment, the control processor complex 310 contains control circuitry configured to handle the routing, forwarding, and processing of the data traffic. The control processor complex 310 also stores routing information 331 indicating where to forward traffic incoming to the network node 300, a protocol stack 333 for handling protocol level packets, and various configuration information 225. It is understood that the network node 110 may include additional components and information than what is described above.

Figure 4:
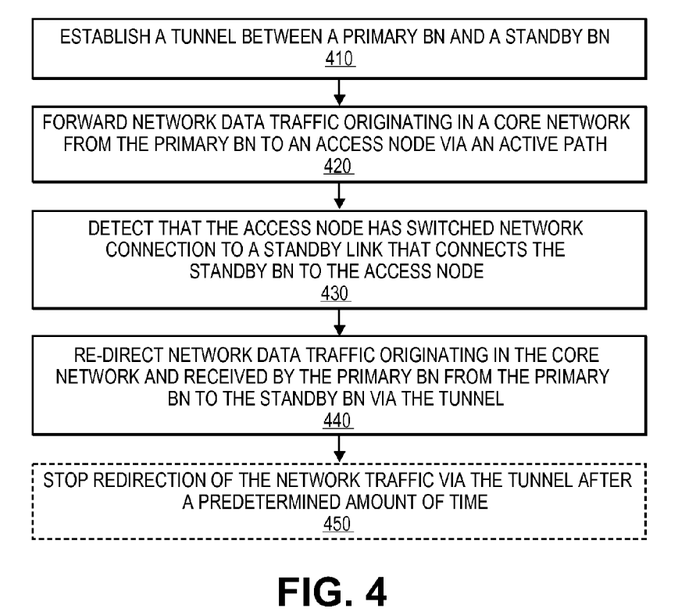
FIG. 4 is a flow diagram illustrating an embodiment of a method for recovering from a failure in an access network.

FIG. 4 illustrates an embodiment of a method 400 for re-routing data traffic via a standby BN when a failure occurs to the link connecting a primary BN and an access node. In one embodiment, the method 400 can be performed by a network node (e.g., the network node 300 of FIG. 3A), which functions as a primary BN (e.g., BN1 of FIG. 1A) between an access network and a core network.

The method 400 begins with the primary BN establishing a tunnel from itself to a standby BN (block 410). When the primary BN receives network data traffic, it forwards the traffic originating in the core network from itself to one of the access nodes via an active path (block 420). At certain point of time, the primary BN detects that the access node has switched network connection from the active path to a standby path, which connects the standby BN to the given access node (block 430). The primary BN then re-directs the network data traffic (which originates in the core network and was received by the primary BN) from the primary BN to the standby BN via the previously-established tunnel (block 440). In one embodiment, the primary BN stops re-direction of the network data traffic via the tunnel after a predetermined amount of time (block 450); e.g., this predetermined amount of time can be the estimated time for the routing in the core network to converge.

Figure 5:
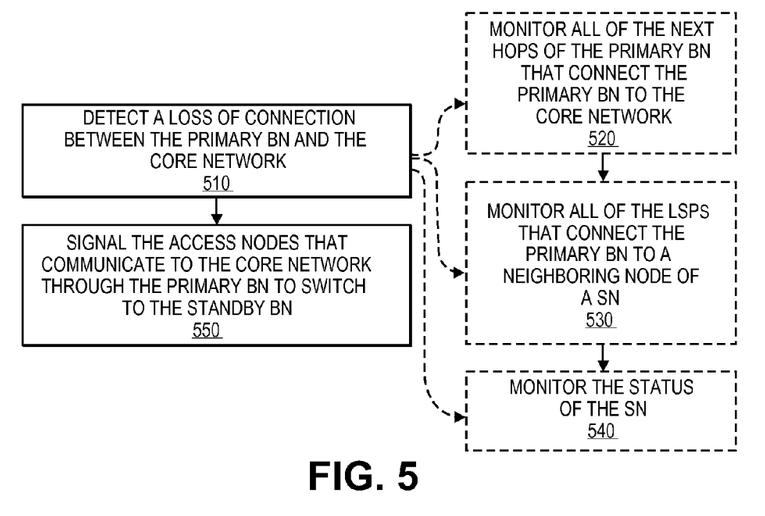
FIG. 5 is a flow diagram illustrating an embodiment of a method for recovering from a failure in a core network.

FIG. 5 illustrates an embodiment of a method 500 for a BN to monitor network connections to the core network. In one embodiment, the method 500 can be performed by a network node (e.g., the network node 300 of FIG. 3A), which functions as a primary BN (e.g., BN1 of FIG. 1B) between an access network and a core network.

The method 500 begins with the primary BN detecting a loss of connection between itself and an SN coupled to the core network (block 510). The primary BN detects the lost connection by monitoring one or more of the following conditions: whether all of its next hops that connect the primary BN to the core network are down (block 520), whether all of the LSP tunnels to the SN(s) in a given VPN are down (block 530), and the status of the SN(s) in a given VPN; e.g., whether any of these SN(s) respond to ping signals (block 540). If all of the next hops are down (when condition C1 is false), all of the tunnel LSPs to all of the SNs in a given VPN are down (when condition C2 is false), or none of the SNs in the given VPN respond to the ping signals (when condition C3 is false), then the primary BN signals the access nodes that communicate to the core network through the primary BN to switchover to the standby BN (block 550). When condition C1 is false, the primary BN sends alarm signals to all of the access nodes that have active connections to the core network through the primary BN. When either condition C2 or C3 is false, the primary BN sends alarm signals to the access nodes in the given VPN that have active connections to the SN(s) in the given VPN through the primary BN. In one embodiment, the conditions C1, C2 and C3 are monitored with rates R(C1), R(C2), R(C3), respectively, which satisfy the following relationship: $R(C1) > R(C2) > R(C3)$, where each rate indicates how often a condition is monitored.

The operations of the diagrams of FIGS. 4 and 5 have been described with reference to the exemplary embodiments of FIG. 3A. However, it should be understood that the operations of the diagrams of FIGS. 4 and 5 can be performed by embodiments of the invention other than those discussed with reference to FIG. 3A, and the embodiments discussed with reference to FIG. 3A can perform operations different than those discussed with reference to the diagrams of FIGS. 4 and 5. While the diagrams of FIGS. 4 and 5 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network node). Such electronic devices store and transmit (internally and/or with other electronic devices over a network) code (composed of software instructions) and data using computer-readable media, such as non-transitory tangible computer-readable media (e.g., computer-readable storage media such as magnetic disks; optical disks; read only memory; flash memory devices) and transitory computer-readable transmission media (e.g., electrical, optical, acoustical or other form of propagated signals—such as carrier waves, infrared signals). In addition, such electronic devices typically include a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory computer-readable medium of a given electronic device typically stores instructions for execution on one or more processors of that electronic device. One or more parts of an embodiment of the invention may be implemented using different combinations of software, firmware, and/or hardware.

As used herein, a network node (e.g., a router, switch, bridge, controller) is a piece of networking equipment, including hardware and software, that communicatively interconnects other equipment on the network (e.g., other network nodes, end stations). Some network nodes are "multiple services network nodes" that provide support for multiple networking functions (e.g., routing, bridging, switching, Layer 2 aggregation, session border control, Quality of Service, and/or subscriber management), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method performed by a primary border node (BN) for internetworking two network domains such that connectivity between the two network domains is maintained when a failure occurs to a node or a link in one of the network domains, the two network domains including an access network that implements MultiProtocol Label Switching Transport Profile (MPLS-TP) and a core network that implements Internet Protocol (IP), MPLS, or a combination of both MPLS and IP, wherein the access network is coupled to the core network via the primary BN and a standby BN, and wherein the access network includes a plurality of access nodes, the method comprising the steps of:

establishing by the primary BN a tunnel from the primary BN to the standby BN;

forwarding network data traffic originating in the core network from the primary BN to a given one of the access nodes via an active path;

detecting by the primary BN that the given access node has switched network connection from the active path to a standby path that connects the standby BN to the given access node; and re-directing by the primary BN the network data traffic originating in the core network and received by the primary BN from the primary BN to the standby BN via the standby BN via the tunnel;

detecting a loss of connection between the primary BN and the core network; and signaling, by the primary BN, the access nodes that communicate to the core network through the primary BN to switch to the standby BN, by sending alarm signals to the access nodes indicating the loss of connection between the primary BN and the core network.

2. The method of claim 1, wherein the step of re-directing further comprises the step of stopping redirection of the traffic via the tunnel after an estimated amount of time for routing of the network data traffic to converge to the standby BN.

3. The method of claim 1, wherein the step of detecting the loss of connection further comprises the steps of:

monitoring all of next hops of the primary BN that connect the primary BN to the core; and signaling all of the access nodes that communicate to the core network through the primary BN to switch to the standby BN in response to a determination that none of the next hops is up.

4. The method of claim 1, wherein the step of detecting the loss of connection further comprises the step of performing a bidirectional forwarding detection (BFD) between the primary BN and each of its next hops.

5. The method of claim 1, further comprising the steps of:

monitoring all of label switched paths (LSPs) that connect the primary BN to a service node (SN) that is coupled to the core network and provides network service to the access nodes; and signaling all of the access nodes that communicate to the SN through the primary BN to switch to the standby BN in response to a determination that none of the LSPs is up.

6. The method of claim 1, further comprising the steps of:

sending a ping signal from the primary BN to an SN via the core network, wherein the SN provides network service to the access nodes; and signaling all of the access nodes that communicate to the SN through the primary BN to switch to the standby BN when a failure is detected in response to the ping signal.

7. The method of claim 1, further comprising the steps of:

monitoring all of next hops of the primary BM that connect the primary BN to the core network at a first rate of monitoring;

monitoring all of LSPs that connect the primary BN to an SN at a second rate of monitoring, wherein the SN is coupled to the core network and provides network service to the access nodes; and sending a ping signal from the primary BN to the SN via the core network at a third rate of sending, wherein the first rate is greater than the second rate, and the second rate is greater than the third rate.

8. The method of claim 1, wherein each of the active path and the standby path is a MPLS-TP pseudowire.

9. A network node functioning as a primary border node (BN) provides internetworking between two network domains such that connectivity between the two network domains is maintained when a failure occurs to a node or a link in one of the network domains, the two network domains including an access network that implements MultiProtocol Label Switching Transport Profile (MPLS-TP) and a core network that implements Internet Protocol (IP), MPLS, or a combination of both MPLS and IP, wherein the access network is coupled to the core network via the primary BN and a standby BN, and wherein the access network includes a plurality of access nodes, the network node comprising:

receiver circuitry configured to receive network data traffic from the core network and the access network;

transmitter circuitry configured to send the received network data traffic to the core network and the access network;

a processor coupled to the receiver circuitry and the transmitter circuitry, the processor configured to forward the network data traffic originating in the core network from the primary BN to a given one of the access nodes via an active path, detect that the given access node has switched network connection from the active path to a standby path that connects the standby BN to the given access node; and an internetworking module coupled to the processor, the internetworking module configured to establish a tunnel between the primary BN and the standby BN prior to detection of switched network connection, and to re-direct the network data traffic originating in the core network and received by the primary BN from the primary BN to the standby BN via the tunnel, wherein the processor is further configured to detect a loss of connection between the primary BN and the core network and to signal the access nodes that communicate to the core network through the primary BN to switch to the standby BN, by sending alarm signals to the access nodes indicating the loss of connection between the primary BN and the core network.

10. The network node of claim 9, wherein the internetworking module is further configured to stop redirection of the traffic via the tunnel after an estimated amount of time for routing of the network data traffic to converge to the standby BN.

11. The network node of claim 9, wherein the processor further comprises a monitoring module to monitor all of next hops of the primary BN that connect the primary BN to the core network, and in response to a determination that none of the next hops is up, the monitoring module is to signal all of the access nodes that communicate to the core network through the primary BN to switch to the standby BN.

12. The network node of claim 9, wherein the processor is further configured to detect the loss of connection by performing a bidirectional forwarding detection (BFD) between the primary BN and each of its next hops.

13. The network node of claim 10, wherein the processor further comprises a monitoring module to monitor all of label switched paths (LSPs) that connect the primary BN to an SN, wherein the SN is coupled to the core network and provides network service to the access nodes, and in response to a determination that none of the LSPs is up, the monitoring module is configured to signal all of the access nodes that communicate to the SN through the primary BN to switch to the standby BN.

14. The network node of claim 10, wherein the processor further comprises a monitoring module to send a ping signal from the primary BN to an SN via the core network, wherein the SN provides network service to the access nodes, and when a failure is detected in response to the ping signal, the monitoring module is configured to signal all of the access nodes that communicate to the SN through the primary BN to switch to the standby BN.

15. The network node of claim 10, wherein the processor further comprises a monitoring module, which is configured to monitor all of next-hop nodes of the primary BN in the core network at a first rate of monitoring, to monitor all of LSPs that connect the primary BN to an SN at a second rate of monitoring, wherein the SN is coupled to the core network and provides network service to the access nodes, and to send a ping signal from the primary BN to the SN via the core network at a third rate of sending, wherein the first rate is greater than the second rate, and the second rate is greater than the third rate.

16. The network node of claim 10, wherein each of the active path and the standby path is a pseudowire in a MPLS-TP network domain.

17. The network node of claim 10, wherein each of the primary BN and the standby BN is a router.

18. A method performed by a primary router for internetworking two network domains such that connectivity between the two network domains is maintained when a failure occurs to a node or a link in one of the network domains, the two network domains including an access network that implements MPLS-TP (MultiProtocol Label Switching-Transport Profile) and a core network that implements Internet Protocol (IP) or MPLS, wherein the access network is coupled to the core network via the primary router and a standby router, and wherein the access network includes a plurality of access nodes which connect a plurality of base stations to the primary router, the method comprising the steps of:

- detecting by the primary router that a given one of the access nodes has switched network connection from an active link to a standby link, wherein the active link connects the given access node to the primary router and the standby link connects the given access node to the standby router;
- re-directing by the primary router network data traffic originating in the core network and received by the primary router from the primary router to the standby router via a tunnel established between the primary router and the standby router;
- detecting a loss of connection between the primary router and the core network; and
- signaling, by the primary router, the access nodes that communicate to the core network through the primary router to switch to the standby router, by sending alarm signals to the access nodes indicating the loss of connection between the primary router and the core network.

* * * * *

UNITED STATES PATENT AND TRADEMARK OFFICE
CERTIFICATE OF CORRECTION

PATENT NO.        : 9,185,025 B2                                  Page 1 of 1
APPLICATION NO.   : 13/531236
DATED             : November 10, 2015
INVENTOR(S)       : Kini et al.

It is certified that error appears in the above-identified patent and that said Letters Patent is hereby corrected as shown below:

In the specification,
In Column 6, Line 16, delete "Cb 2(SN)" and insert -- C2(SN) --, therefor.

In the claims,
In Column 9, Line 7, in Claim 1, delete "node; and" and insert -- node; --, therefor.

Signed and Sealed this
First Day of March, 2016

Michelle K. Lee
*Director of the United States Patent and Trademark Office*